A. KEMPINSKI.
TARGET.
APPLICATION FILED OCT. 19, 1914.

1,269,942. Patented June 18, 1918.

Witnesses:
Louise Enderle.
David H. Douglas.

Inventor
Albin Kempinski
By his Attorney

UNITED STATES PATENT OFFICE.

ALBIN KEMPINSKI, OF CORONA, NEW YORK, ASSIGNOR OF ONE-HALF TO CHARLES DIETRICH.

TARGET.

1,269,942.　　　　　Specification of Letters Patent.　　Patented June 18, 1918.

Application filed October 19, 1914. Serial No. 867,294.

*To all whom it may concern:*

Be it known that I, ALBIN KEMPINSKI, a citizen of the United States, residing at Corona, L. I., in the county of Queens and State of New York, have invented certain new and useful Improvements in Targets, of which the following is a specification, reference being had therein to the accompanying drawing.

My invention relates to improvements in targets and attachments therefor adapted to restore the position of articles upon a rack such as birds, dolls or similar articles which are usually shot at or thrown at for purposes of amusement.

Figure 1:
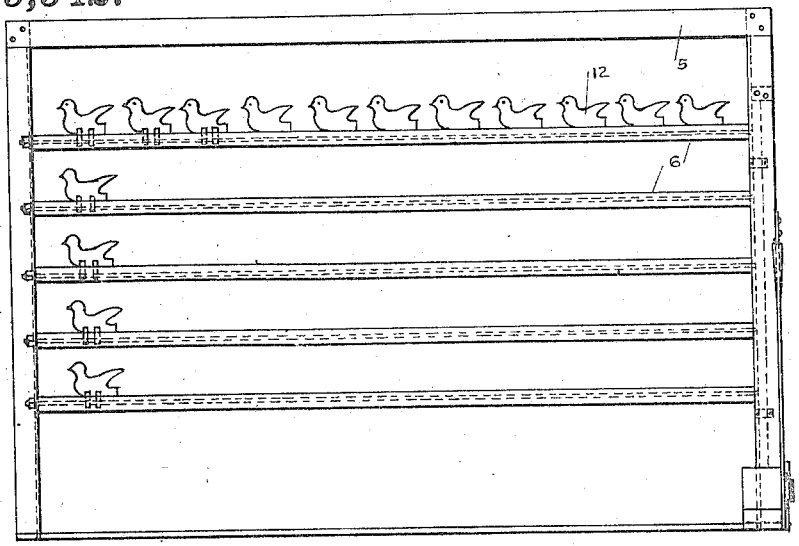
Figure 2:
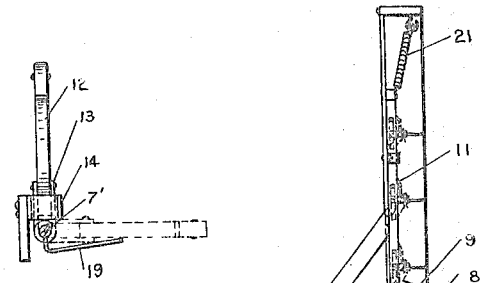
Figure 3:
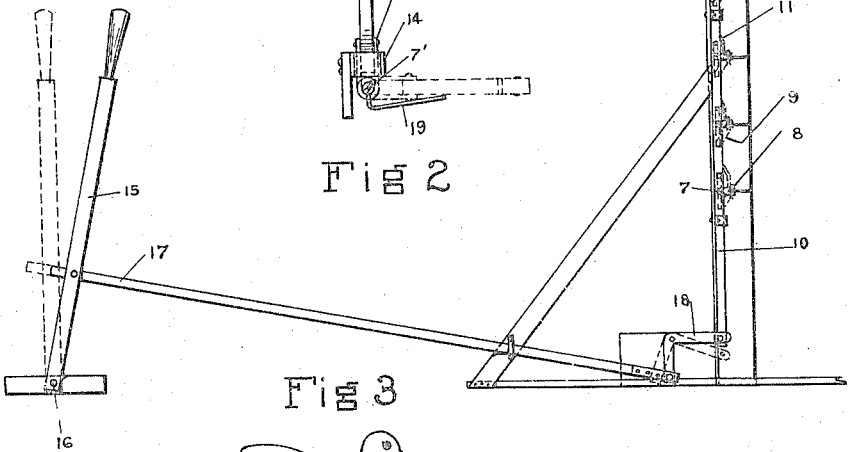
Figure 4:
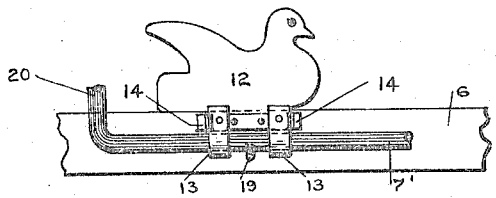

In the accompanying drawings I have illustrated an application of my invention. In Figure 1 I have shown a front elevation of a rack embodying an application of my invention as applied to birds used in a shooting gallery. Fig. 2 is an enlarged detail of an end view illustrating a modification. Fig. 3 is a side view looking at Fig. 1 with the addition of the operating lever and connections, and Fig. 4 is an enlarged view looking at the back of a small section of Fig. 1, modified as shown by Figs. 2 and 4.

5 indicates a suitable frame provided with cross pieces such as 6 behind which may be mounted suitable bars such as 7, shown to better advantage in Fig. 3. 8 is another bar behind the bar 7 to which is suitably secured or keyed the connecting lever such as 9 which in turn is pivoted upon the vertical rod 10. The bar 8 is also preferably provided with a restoring pin or bracket 11 which is adapted to engage the back of the birds or ducks such as 12.

Each duck is provided with a base to which is secured metallic loops such as 13 and adjacent to each base on the cross-piece 6 is mounted a spring or clip such as 14. These metallic loops 13 are adapted to receive the bar 7 shown in Fig. 3 so that the bird or duck 12 may swing around the bar 7, but when in the position shown in Fig. 4, the base of the bird 12 is retained upright by the clip 14 which engages the same. The hand lever 15 is pivotally mounted on the floor as indicated at 16 and is pivotally connected to the long rod 17 which in turn is pivotally connected to the bell crank 18, the end of which is pivotally connected to the upright rod or lever 10. The birds 12 mounted upon the stationary bars 7 when struck with a bullet, of course drop back upon the same swinging around the bar by the loops 13, and when the birds are to be replaced, by pulling the hand lever 15 leftwardly the bell crank 18 draws the vertical rod 10 downwardly and with it the link 9 thereby rotating the rod 8 carrying the fingers 11 which lift the birds again in an upright position upon the bars 7 where they are retained upright by the resilient clips 14, which clips of course engage the bases of the birds very lightly so that the force of the bullet easily overcomes the engagement and the birds drop down.

In the modification shown in Fig. 2 the bar 7' is mounted in the frame 5 in the same position as the bar 7 in Fig. 3. This bar 7' is also indicated in Fig. 4 in which case the pin or finger 19 takes the place of the fingers 11; thus eliminating the necessity for the bar 8. The birds 12 are provided with loops or U-shaped pieces such as 13 in the usual way and are carried by the bar 7' and when released from the clips 14 mounted upon the cross pieces 6, swing down upon the bar 7' in the same manner, but the bars 7' instead of being stationary like the bars 7 are preferably provided with a crank such as 20 at one end which may be pivotally connected to the vertical rod 10, so that by operating the hand lever 15 each of the bars 7' would be rotated sufficiently so that the pins or fingers 19 thereupon throw the birds 12 from the horizontal to the vertical position shown in Fig. 2 where they remain in engagement with the clips 14 as previously stated.

21 indicates a spring attached to the upper end of the vertical rod 10 and to the top of the frame 5 which normally keeps the bar 10 in its upward position, so that as the lever 15 is pulled toward the operator, the vertical bar 10 pulls against the tension of the spring 21 and rotates the rods 8 leftwardly looking at Fig. 3.

Of course it will be understood that animals, dolls, or various articles might be mounted instead of the birds. When the dolls are used, instead of shooting them down the same as birds, they may be knocked down with balls, and various modifications may be made in the construction and details of the apparatus without departing from the spirit of the invention as claimed.

I claim:

In an apparatus of the class described, a rack upon which objects may be secured in exposed position, resilient means at the base of each of said objects adapted to secure the same in said position until thrown down by impact, and restoring means comprising pivoted levers extending parallel with the bases of said objects and having fingers secured thereupon adapted to lift said objects and replace the same within said resilient means, and means for operating said pivoted levers.

In testimony whereof I hereunto affix my signature in the presence of two witnesses.

ALBIN KEMPINSKI.

Witnesses:
 LOUISE ENDERLE,
 THOMAS A. HILL.

Copies of this patent may be obtained for five cents each, by addressing the "Commissioner of Patents, Washington, D. C."